United States Patent Office 2,767,078
Patented Oct. 16, 1956

2,767,078

PROCESS FOR DESILICONIZING AND
DESULPHURIZING PIG IRON

René Perrin, Paris, France, assignor to Societe d'Electro-Chimie d'Electro-Metallurgie et des Acieries Electriques d'Ugine, Paris, France No Drawing. Application July 31, 1953,
Serial No. 371,706

Claims priority, application France August 6, 1952

5 Claims. (Cl. 75—54)

This invention relates to a process for desiliconizing and desulphurizing pig iron.

The desiliconizing and the control of the silicon content of pig iron are important metallurgical problems. When pig iron is intended to be blown in a basic converter, a high percentage of silicon hinders the desired dephosphorization and requires an addition of a supplementary quantity of lime. It also increases the iron losses in the slag and by spattering during the treatment in the converter, thereby increasing the cost of the process. Furthermore, the frequent irregularities of the silicon contents of the pig iron coming from the blast furnace are a cause of irregularities in the working of the basic converter and in the quality of the steel produced in the converter. When pig iron is intended to be added to an open hearth furnace and a charge is to be dephosphorized, it also is desirable that the silicon content of the pig iron be low because the higher the silicon content, the more the dephosphorization is hindered and the more are the quantities of lime and iron ore which must be added.

If one desires to desiliconize pig iron by means of a single slag treatment, a distinctly oxidizing slag, containing important contents of iron and/or manganese oxides, must be used.

The desulphurizing of pig iron also is an important problem. Pig iron containing low sulphur can be made in a blast furnace if a highly basic charge is employed or if the blast furnace is so operated as to produce pig iron having a high manganese content. However, such methods are expensive. Accordingly, in order to supply the converters or open hearth furnaces with pig iron of relatively low sulphur content, it is common practice to produce pig iron in a blast furnace in the usual manner and thereafter to desulphurize the pig iron by means of a basic slag having a low melting point and containing only small quantities of iron and/or manganese oxides. These basic slags may contain lime, sodium carbonate or caustic soda, for example. Because these slags contain only small quantities of iron and/or manganese oxides, they are generally referred to as reducing slags.

From what has been said, substantial desiliconizing and desulphurizing of pig iron by slags would seem to require, necessarily, treatment of the pig iron by two successive different slags, the one being an oxidizing slag for removing silicon and the other being a reducing slag for removing sulphur. The use of two different slags presents many difficulties and increases the cost of the process.

In accordance with the present invention, I am able to accomplish the desiliconizing and desulphurizing of pig iron by mixing only a single slag of proper composition and amount with molten pig iron. I can even predetermine the amount of silicon which will be removed from the pig iron.

The invention consists essentially in treating molten pig iron with a certain proper weight of slag containing, beside basic elements capable of removing sulphur, and if desired other elements, oxides of metals in such a quantity as to oxidize the amount of silicon which it is desired to eliminate from the pig iron, and in extending the action of the slag after this oxidation of the silicon for a time sufficient for the slag, the analysis of which has then been greatly altered, to desulphurize the pig iron. The preferred basic elements are lime, magnesia, barium oxide and soda. The preferred metal oxides are iron and manganese oxides.

More particularly, my process comprises mixing molten pig iron with a basic oxidizing slag containing one or more basic elements, for example, lime, magnesia, barium oxide or soda, the slag also containing one or more oxidizing elements such as iron oxide or manganese oxide. The amount of slag mixed with the pig iron is so proportioned as to oxidize the amount of silicon which it is desired to remove from the pig iron. At first, most of the iron oxide and manganese oxide is reduced to iron and manganese and progressively the slag is converted to a reducing slag. It is preferred that substantially all of the iron oxide and manganese oxide be reduced to iron and manganese. Then the action of the slag on the pig iron is continued for a time sufficient for the desulphurizing elements to lower the sulphur content of the pig iron.

At the beginning of the operation the silicon of the pig iron reduces most and preferably substantially all of the iron and manganese oxides of the slag, the slag becomes at the same time enriched in silica, which combines with the bases. If the quantity and the composition of the initial slag have been so selected that, after this enrichment in silica, the slag remains melted on the one hand, and has a desulphurizing character on the other hand, a substantial desulphurization of the pig iron occurs in the course of the extension of the operation.

These two conditions, that the final slag has to be molten at the temperature of the iron—which is generally distinctly lower than that of the melting point of steel—and on the other hand, that the slag has a distinctly desulphurizing power, limit greatly the scope of utilizable slag compositions, particularly when one desires to employ compositions containing principally readily available and inexpensive products so as not to unduly increase the cost of the process. The composition of the slags which can be used economically is furthermore limited by the fact that the slags which have the strongest desulphurizing power are the most basic and consequently are the most refractory. Thus the slags generally used for desulphurizing steel do not melt at the usual temperatures for desulphurizing pig iron and cannot be used in this process.

In order to determine the composition of the initial slag, it is advisable to work in the following way. One previously determines the kind of slag which one desires to obtain at the end of the desiliconization. This slag must be desulphurizing and must contain silica. Since this slag must be desulphurizing, it must be a basic reducing slag in contrast to an oxidizing slag.

In the analysis of the so selected slag, silica is replaced partially or totally by iron oxide and/or manganese oxide and it is this new composition which is selected for the initial slag.

The quantity of slag to be used will be determined by the amount of silicon to be eliminated from the pig iron, taking into consideration the proportions of oxides reducible by silicon which are contained in the slag. The higher is this proportion of oxides, the lower will be the amount of slag required for eliminating a given amount of silicon from the pig iron.

If the proportion of oxides in the slag is relatively low, a greater amount of slag will have to be used, but one will then obtain a final slag less rich in silica. In this case the desulphurization will be easier both because of its larger amount and because of its low silica content.

I have referred herein to the initial slag, the final slag, and the slag at the end of the desiliconization. The initial slag is, of course, the slag at the beginning of the desiliconizing operation. The slag at the end of the desiliconization is essentially the same as the slag at the end of the desulphurization, the only difference being that at the end of the desulphurization the slag contains more sulphur. Thus one can use the term "final slag" to designate either the slag at the end of the desulphurization or the slag at the end of the desiliconization.

Generally, it is necessary that the slag be molten at the beginning of the treatment and remain so throughout the entire treatment. Generally, this condition is automatically fulfilled when the above-mentioned kinds of slags are used, and this is particularly the case the higher the quantity of slag which is used and the lower the quantity of silicon which is to be eliminated from the pig iron, these two factors reducing the variation of the composition of the slag during the course of the process.

In order to obtain a very good desulphurization, it is advisable to have a certain quantity of reducing metal in the pig iron at the end of the desiliconization. Usually this reducing metal is silicon. The presence of a certain quantity of silicon in the pig iron at the end of the desiliconization is insured by using an amount of slag which contains less oxide than is required to oxidize all of the silicon in the pig iron. However, another method of insuring the presence of a reducing element in the pig iron at the end of the desiliconization is to add a reducing agent such as aluminum, titanium, calcium or magnesium at or toward the end of the desiliconization.

The treatment of the pig iron with the slag can be effected in a special furnace or in a mixer. Operations of intermixing slag or metal can also be done according to the prior art, for instance, by a violent pouring of the pig iron into a ladle containing the molten slag. In any event, it is necessary that contact between metal and slag be maintained for a sufficiently long time after reduction of the oxides has taken place so that the slag has a sufficient time to exert its desulphurizing action on the pig iron.

Because of the exothermic character of the reaction (reduction of iron and manganese oxides by silicon), the use of outside heating in the course of the treatment can be much reduced or even eliminated. In case the operation is performed in a container which is not heated, it is better, however, to introduce the slag in the molten state, or at least preheat it. In that case, the pig iron bath does not cool during the course of the treatment and its temperature may even increase.

In addition to the fact that the process requires little or no external heat, it is particularly inexpensive because it results in a reintroduction of iron and/or manganese into the pig iron. The quantities of these reintroduced elements vary according to the nature of the oxides used ($Fe_2O_3$, FeO, MnO). Practically they amount to between 2.6 and 4 times the weight of the silicon eliminated from the pig iron.

The process can be advantageously used for the desiliconizing and desulphurizing of pig iron coming directly from the blast furnace. In that case, the working of the blast furnace can be altered. It can especially work with lower indexes of basicity and larger introductions of silicon because this silicon will be partially replaced by iron and manganese in the course of the desiliconizing treatment.

The following examples further illustrate but are not restrictive of the invention.

*Example 1*

A pig iron containing:

| | Percent |
|---|---|
| C | 3.3 |
| Si | 0.5 |
| Mn | 1.2 |
| S | 0.08 |
| P | 2 | was desiliconized and desulphurized by mixing it with a slag having the folowing composition:

| | Percent |
|---|---|
| CaO | 39 |
| $CaF_2$ | 22 |
| $Fe_2O_3$ | 39 |

The weight of slag employed was about 30 kgs. per metric ton of pig iron.

In the course of the treatment, the slag composition varied in consequence of the oxidation of the silicon by the iron oxide, and lastly, the slag absorbed sulphur for the pig iron. At the end of the process the slag had the following composition:

| | Percent |
|---|---|
| CaO | 45 |
| $CaF_2$ | 25 |
| $SiO_2$ | 26 |
| S | 2.4 |

The silicon and sulphur contents of the pig iron were reduced respectively to:

| | Percent |
|---|---|
| Si | 0.2 |
| S | 0.015 |

The carbon, manganese and phosphorus contents had not practically been altered.

*Example 2*

The same pig iron as used in Example 1 was treated with about 30 kgs. of slag per metric ton of pig iron, the initial composition of the slag being as follows:

| | Percent |
|---|---|
| $SiO_2$ | 7.7 |
| $Fe_2O_3$ | 40 |
| $Al_2O_3$ | 11 |
| MgO | 6.3 |
| CaO | 34.4 |

At the end of the treatment the slag had the following composition:

| | Percent |
|---|---|
| $SiO_2$ | 35 |
| $Al_2O_3$ | 13 |
| MgO | 8 |
| CaO | 41 |
| S | 1.8 |

The silicon and sulphur contents of the pig iron were lowered respectively to:

| | Percent |
|---|---|
| Si | 0.2 |
| S | 0.035 |

The carbon, manganese and phosphorus contents had not been altered.

From the above it can be seen that by my process, pig iron can be desiliconized and desulphurized using only a single slag which greatly decreases the cost of the operation as compared with the case where two different slags are employed.

The invention is not limited to the preferred embodiment but may be otherwise embodied or practiced within the scope of the following claims.

I claim:

1. A process for producing from a starting pig iron, a modified pig iron containing lower amounts of silicon and sulphur than the starting pig iron, which comprises mixing molten starting pig iron with a basic oxidizing slag containing a basic element capable of removing sulphur and of the group consisting of lime, magnesia and barium oxide and also containing an oxidizing element of the group consisting of iron oxide and manganese oxide, the amount and composition of said slag being such that the slag contains less iron oxide and manganese oxide than is required to oxidize all the silicon of the starting pig iron so that after reaction to replace most of the iron oxide and manganese oxide in said slag by silica the pig iron contains a substantial amount of silicon and the slag is converted to a reducing slag, carrying out the reaction until most of the iron oxide and manganese oxide is reduced to iron and manganese and the slag is converted to a reducing slag, and continuing the action of the reducing slag on the pig iron containing a substantial amount of silicon for a time sufficient to substantially lower the sulphur content of the pig iron.

2. A process according to claim 1, wherein substantially all of the iron oxide and manganese oxide is reduced to iron and manganese.

3. A process according to claim 1, wherein a reducing agent of the group consisting of aluminum, titanium, calcium and magnesium is added to aid in the removal of sulphur.

4. A process according to claim 1, wherein the initial slag contains by weight about

| | Percent |
|---|---|
| CaO | 39 |
| $CaF_2$ | 22 |
| $Fe_2O_3$ | 39 |

5. A process according to claim 1, wherein the initial slag contains by weight about

| | Percent |
|---|---|
| $SiO_2$ | 8 |
| $Fe_2O_3$ | 40 |
| $Al_2O_3$ | 11 |
| MgO | 6 |
| CaO | 34 |

References Cited in the file of this patent

UNITED STATES PATENTS

| Number | Name | Date |
|---|---|---|
| 476,091 | Talbot | May 31, 1892 |
| 571,538 | Saniter | Nov. 17, 1896 |
| 600,105 | Wellman et al. | Mar. 1, 1898 |
| 1,162,755 | Dinkey | Dec. 7, 1915 |
| 2,110,066 | Heuer | Mar. 1, 1938 |
| 2,123,658 | Perrin | July 12, 1938 |
| 2,198,625 | Koppers | Apr. 30, 1940 |